(12) United States Patent
Moriyama et al.

(10) Patent No.: US 9,739,953 B2
(45) Date of Patent: Aug. 22, 2017

(54) OPTICAL CONNECTOR (71) Applicant: FUJITSU COMPONENT LIMITED, Tokyo (JP)

(72) Inventors: Satoshi Moriyama, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/165,035

(22) Filed: May 26, 2016

(65) Prior Publication Data
US 2016/0356962 A1    Dec. 8, 2016

(30) Foreign Application Priority Data
Jun. 2, 2015 (JP) ................. 2015-112610

(51) Int. Cl.
*G02B 6/38*    (2006.01)
*G02B 6/42*    (2006.01)

(52) U.S. Cl.
CPC ........... *G02B 6/387* (2013.01); *G02B 6/4284* (2013.01); *G02B 6/3853* (2013.01); *G02B 6/3861* (2013.01); *G02B 6/3885* (2013.01); *G02B 6/4206* (2013.01); *G02B 6/4292* (2013.01)

(58) Field of Classification Search
CPC ................................ G02B 6/38; G02B 6/387
USPC ......................................................... 385/78
See application file for complete search history.

(56) References Cited

U.S. PATENT DOCUMENTS

| | | | | |
|---|---|---|---|---|
| 6,341,898 B1 * | 1/2002 | Matsushita | .......... | G02B 6/4245 385/139 |
| 6,439,780 B1 * | 8/2002 | Mudd | .................. | G02B 6/3807 385/83 |
| 6,443,630 B1 * | 9/2002 | Serizawa | ................. | G02B 6/25 385/88 |
| 6,477,056 B1 * | 11/2002 | Edwards | .............. | G02B 6/4214 361/752 |
| 6,795,461 B1 * | 9/2004 | Blair | .................... | G02B 6/4292 372/101 |
| 7,452,139 B2 * | 11/2008 | Wang | ................... | G02B 6/3887 385/89 |
| 2002/0154872 A1 * | 10/2002 | Miyokawa | ........... | G02B 6/4201 385/92 |
| 2003/0048996 A1 * | 3/2003 | Lowe | ................... | G02B 6/3887 385/81 |
| 2004/0126069 A1 * | 7/2004 | Jong | ..................... | G02B 6/3878 385/109 |
| 2012/0155807 A1 * | 6/2012 | Knapp | ..................... | G02B 6/32 385/61 |
| 2012/0205825 A1 * | 8/2012 | Nagafuji | .............. | G02B 6/3855 264/1.25 |
| 2013/0163930 A1 * | 6/2013 | Jian | .......................... | G02B 6/36 385/60 |
| 2013/0183009 A1 * | 7/2013 | Meng | ....................... | G02B 6/42 385/89 |

(Continued)

FOREIGN PATENT DOCUMENTS

JP    2011-075814    4/2011

*Primary Examiner* — Kaveh C Kianni
(74) *Attorney, Agent, or Firm* — IPUSA, PLLC (57) ABSTRACT

An optical connector includes a ferrule, an optical waveguide attached to the ferrule, and a boot attached to the ferrule to protect the optical waveguide, wherein the boot includes a cover part that covers the ferrule.

6 Claims, 9 Drawing Sheets

(56) References Cited

U.S. PATENT DOCUMENTS

2015/0286013 A1* 10/2015 Matsumura .......... G02B 6/3821
                                                                  385/60
2016/0266340 A1*  9/2016 Zhang ..................... G02B 6/32

* cited by examiner

OPTICAL CONNECTOR

BACKGROUND OF THE INVENTION

1. Field of the Invention

The disclosures herein relate to an optical connector.

2. Description of the Related Art

A recent increase in the volume of optical communication has resulted in a demand for increased packaging density of optical connectors. A small-size optical connector of a QSFP (Quad Small Form-Factor Pluggable) type, for example, has both an MT (mechanically transferable) ferrule that allows multiple optical fibers or the like to be connected in a lump and a lens ferrule that is connected to an optical waveguide coupled to a photoelectric conversion device. The MT ferrule and the lens ferrule are brought into fact-to-face contact with each other so as to establish a connection between an optical cable coupled to the MT ferrule and the optical waveguide coupled to the lens ferrule.

Excessive bending of an optical waveguide degrades the optical transmission characteristics thereof. To prevent this, a ferrule boot for protecting the optical waveguide is provided.

An external force may be applied to a lens ferrule during manufacturing of an optical connector or when handling the optical connector. When a force is applied to the lens ferrule, the ferrule boot may be disconnected from the lens ferrule. Upon the disconnection of the ferrule boot from the lens ferrule, the optical waveguide is not properly protected, and may cause the optical transmission loss.

Accordingly, an illustrative purpose of the invention may be to provide an optical connector that prevents the disconnection of a ferrule boot.

[Patent Document 1] Japanese Laid-open Patent Publication No. 2011-075814

SUMMARY OF THE INVENTION

It is a general object of the present invention to provide an optical connector that substantially obviates one or more problems caused by the limitations and disadvantages of the related art.

According to an embodiment, an optical connector includes a ferrule, an optical waveguide attached to the ferrule, and a boot attached to the ferrule to protect the optical waveguide, wherein the boot includes a cover part that covers the ferrule.

According to at least one embodiment, the disconnection of a ferrule boot is prevented.

BRIEF DESCRIPTION OF THE DRAWINGS

Other objects and further features of the present invention will be apparent from the following detailed description when read in conjunction with the accompanying drawings, in which.

DESCRIPTION OF EMBODIMENTS

In the following, various non-limiting embodiments of the present invention will be described with reference to the accompanying drawings.

In illustrations provided in the drawings, the same or corresponding members or elements are referred to by the same or corresponding numerals, and duplicate descriptions thereof will be omitted. Further, the drawings are not provided for the purpose of illustrating size ratios between members or elements unless otherwise specified. Specific sizes may be determined by those skilled in the art by referring to the non-limiting embodiments that will be described hereinafter.

Further, the embodiments that will be described hereinafter are examples only that do not limit the invention. Features and combinations thereof described in these embodiments may not necessarily be essential to the invention.

In the following description, the direction indicated by arrows X1 and X2 is referred to as a contact direction. The direction indicated by arrows Y1 and Y2, perpendicular to the contact direction, is referred to as a width direction. The direction indicated by arrows Z1 and Z2, perpendicular to both the contact direction and the width direction, is referred to as a height direction.

Figure 1:
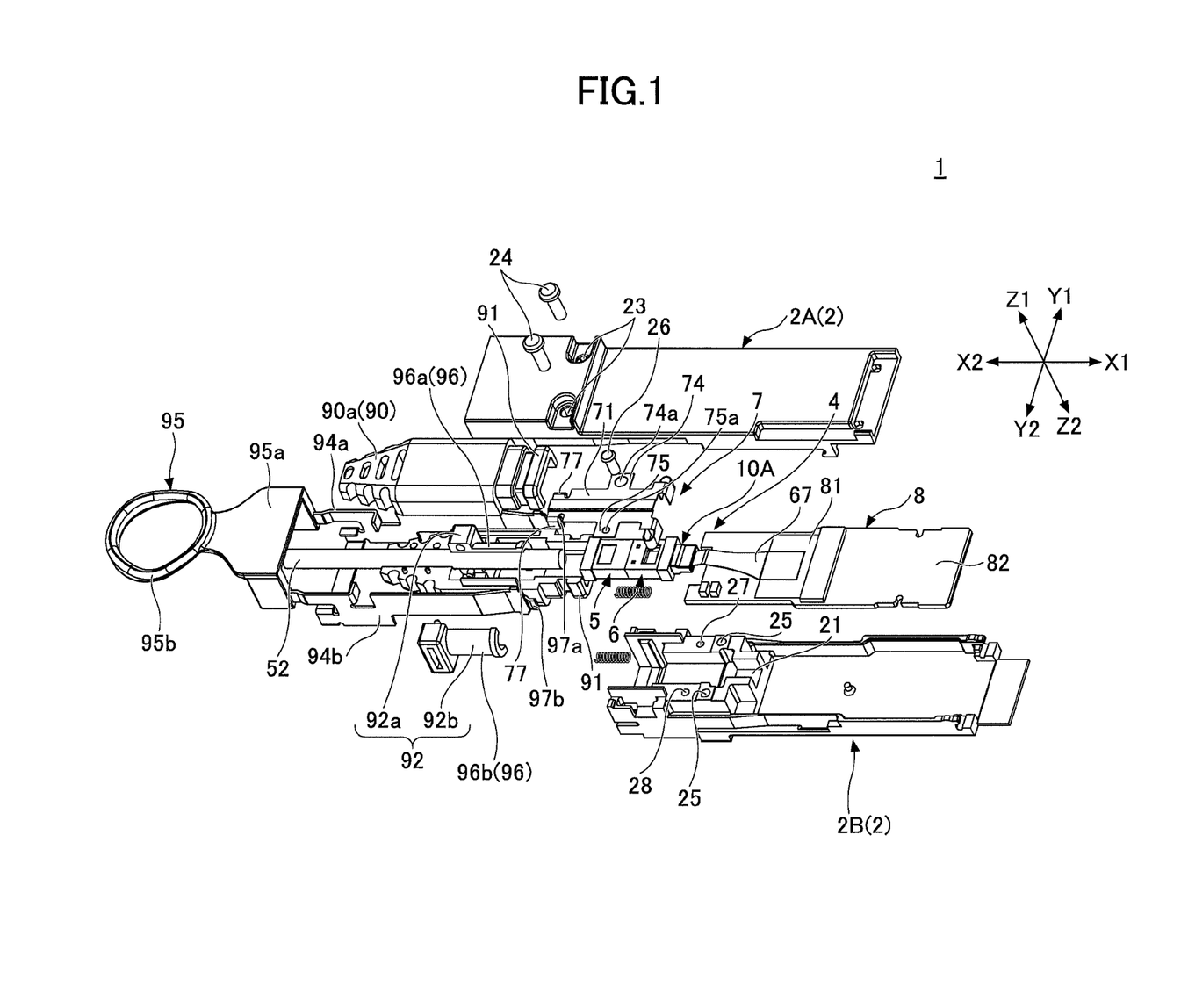
FIG. 1 is an exploded perspective view of an optical connector according to an embodiment.
Figure 2:
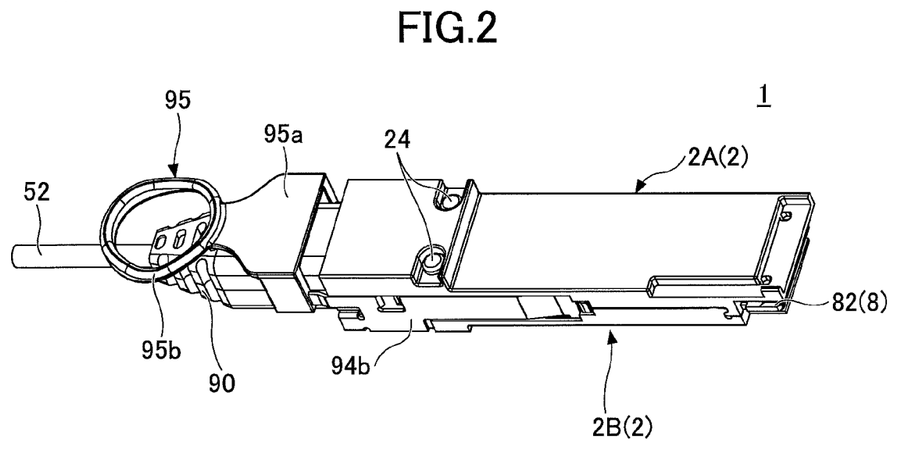
FIG. 2 is a perspective view of the optical connector according to the embodiment.

FIG. 1 is an exploded perspective view of an optical connector 1 according to an embodiment. FIG. 2 is a perspective view of the optical connector 1. The optical connector 1 is a small-size optical connector of the QSFP type having a high packaging density.

The optical connector 1 includes a case 2, an optical module 4, a printed circuit board 8 ("board"), a cable boot 90, and a pull tab 95. The optical connector 1 may be employed in the Ethernet (registered trademark), for example, and may be inserted into and attached to an electronic apparatus (not shown) such as a computer or the like. In FIG. 1, the X1 direction shows a direction in which the optical connector 1 is inserted into the electronic apparatus.

The case 2 includes an upper case 2A and a lower case 2B. The upper case 2A has holes 23 through which screws 24 pass, respectively. The lower case 2B has holes 25 to which screws 24 are threadably attached, respectively. The screws 24 are made to pass through the holes 23, and are threadably attached to the holes 25, such that the upper case 2A and the lower case 2B are integrated to form the case 2. The case 2 has the optical module 4, the board 8, and the cable boot 90 disposed therein.

Figure 3:
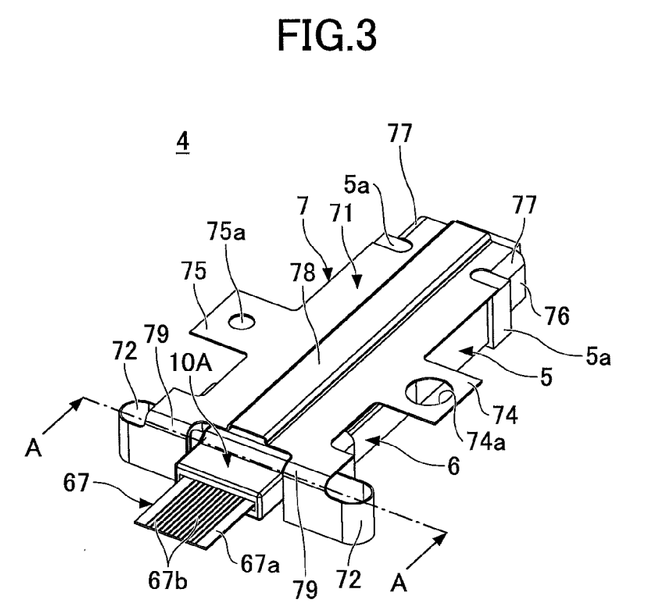
FIG. 3 is a perspective view of an optical module.
Figure 4A:
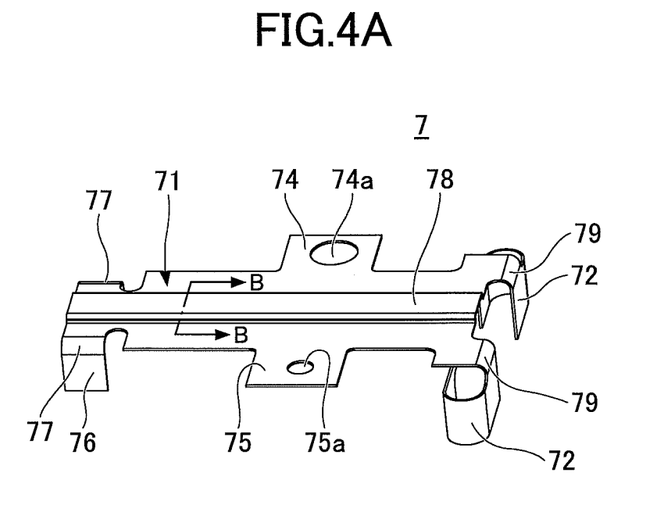
FIG. 4A is a drawing illustrating a perspective view of a clip as viewed from above.
Figure 4B:
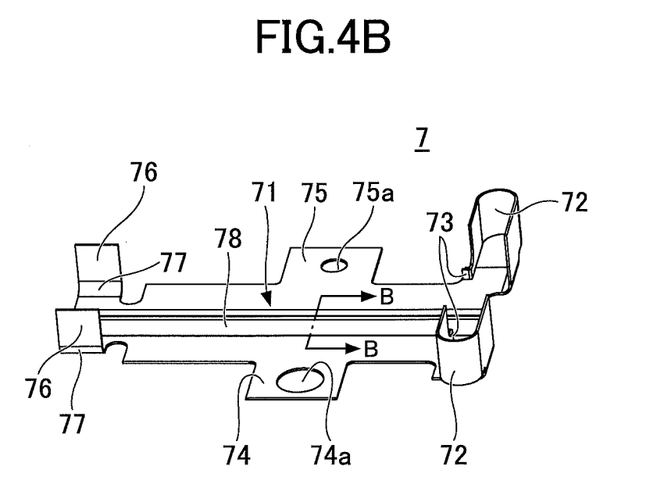
FIG. 4B is a drawing illustrating a perspective view of the clip as viewed from below.
Figure 5:
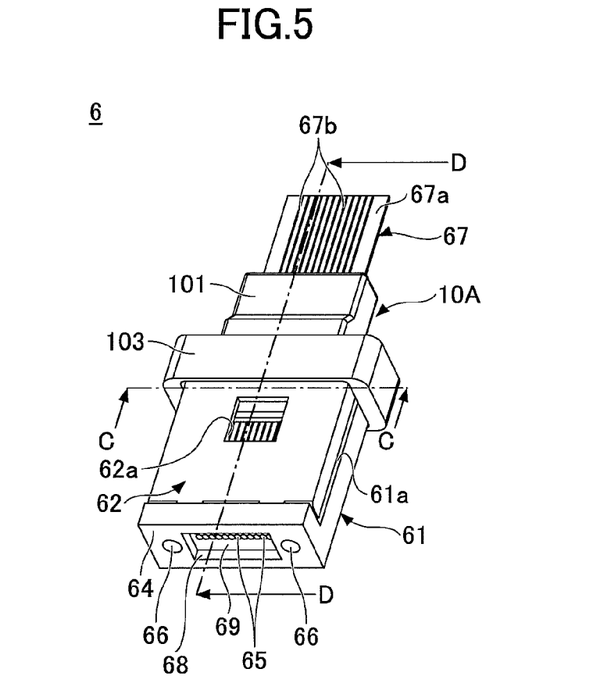
FIG. 5 is a perspective view of a lens ferrule as viewed from a contact-face side.
Figure 6:
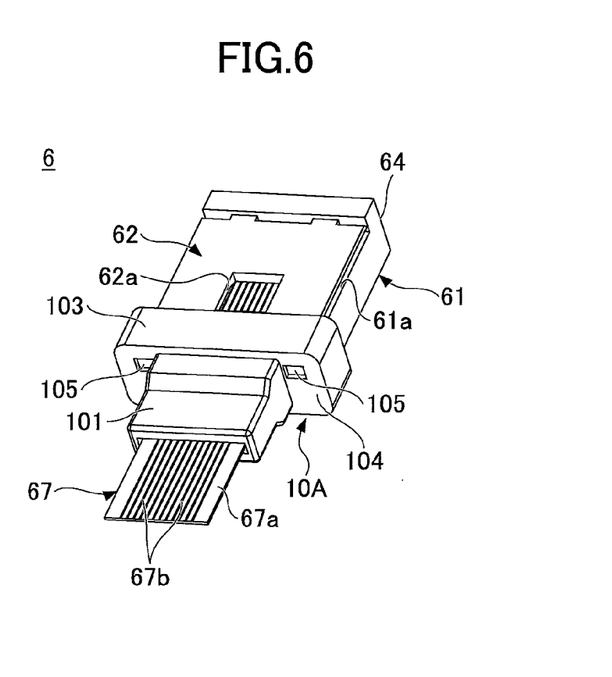
FIG. 6 is a perspective view of the lens ferrule as viewed from a ferrule-boot side.

A description will be given of the optical module 4 by referring to FIG. 3 through FIG. 6 in addition to FIG. 1. FIG. 4 is a perspective view of the optical module 4. FIGS. 4A and 4B are perspective views of a clip 7. FIG. 5 is a perspective view of a lens ferrule 6 as viewed from the front side. FIG. 6 is a perspective view of the lens ferrule 6 as viewed from the rear side.

The optical module 4 includes an MT ferrule 5, the lens ferrule 6, the clip 7, and a ferrule boot 10A.

A multicore optical cable 52 including a plurality of optical fibers is connected to the end of the MT ferrule 5 facing toward the X2 direction.

The end of the MT ferrule 5 facing in the X1 direction has a contact face (now shown) that is brought into face-to-face contact with the lens ferrule 6. The contact face has small holes in one-to-one correspondence with the optical fibers embedded in the optical cable 52.

The holes in the contact face are arranged in one line extending in the width direction. The holes are formed such as to penetrate through the MT ferrule 5 in the contact direction. Each of the holes has a corresponding one of the optical fibers of the optical cable 52 inserted therethrough. A tip of the optical fiber inserted in each hole is aligned and flush with the contact face. The optical fibers are fixed by an adhesive after the alignment.

The contact face has pin holes formed therein into which guide pins are inserted in order to align the MT ferrule 5 with the lens ferrule 6. The pin holes are situated at the opposite side ends on the contact face.

The lens ferrule 6 includes a base 61 and a cover 62 as illustrated in FIG. 5 and FIG. 6.

The end of the lens ferrule 6 facing in the X1 direction is coupled to an optical waveguide 67. The MT ferrule 5 and the lens ferrule 6 are brought into contact with each other, so that the optical cable 52 and the optical waveguide 67 are optically coupled to each other.

The optical waveguide 67 has a film 67a and optical waveguide cores 67b (hereinafter referred to as "cores"). The film 67a is made of resin material such as polyimide. The cores 67b are optically transmissive members, and extend in parallel on the film 67a.

At the end facing in the X2 direction, the lens ferrule 6 has a contact face 64 that is brought into contact with the MT ferrule 5. The contact face has a recess 68, which has an end face 69 on which a plurality of lenses 65 are formed.

The lens ferrule 6 is formed of transparent resin such as COP (cyclo-olefin polymer). The lenses 65 are formed at the same time that the lens ferrule 6 is formed. The lenses 65 are each formed into a semispherical shape.

The positions of the lenses 65 are situated in one-to-one correspondence with the positions of the holes formed in the MT ferrule 5. Further, pin holes 66 are formed in the contact face 64 near both ends of the array of the lenses 65, into which the guide pins are inserted.

A recess 61a is formed in the ferrule base 61. With the recess 61a formed therein, the ferrule base 61 has an L shape as viewed from the Y2 direction. The ferrule cover 62 is disposed on the recess 61a.

In order to couple the optical cable 52 with the optical waveguide 67, the contact face of the MT ferrule 5 and the contact face of the lens ferrule 6 are brought into contact with each other, and the optical fibers of the optical cable 52 are optically coupled to the cores of the optical waveguide 67. The lenses 65 prevent light from being scattered at the optical contact point between the optical fibers and the cores, thereby improving the efficiency of optical transmission.

It is preferable to pressing the MT ferrule 5 and the lens ferrule 6 against each other by a sufficient pressing force in order to secure satisfactory contacts between the optical fibers and the cores. The clip 7 presses the lens ferrule 6 against the MT ferrule 5 with a sufficient pressing force to maintain the condition in which the MT ferrule 5 and the lens ferrule 6 are in contact with each other. In the following description, the MT ferrule 5 and the lens ferrule 6 may collectively be referred to as the ferrules 5 and 6.

The clip 7 also fixedly mounts the MT ferrule 5 and the lens ferrule 6 to the case 2.

The clip 7 includes a base 71, springs 72, mounting sections 74 and 75, engaging sections 76, and a reinforcement section 78 as illustrated in FIG. 3 and FIGS. 4A and 4B. The clip 7 has a unitary, seamless structure that is made from a spring strip. The spring strip may be made of stainless (e.g., SUS304, SUS631), beryllium copper (C1720), phosphor bronze (C5210), or the like, which are not limiting examples.

The base 71 has a substantially rectangular shape which has a longitudinal direction thereof extending in the contact direction. The base 71 has the reinforcement section 78 formed therein to reinforce the stiffness of the base 71. The cross-section of the reinforcement section 78 taken along the B-B line illustrated in FIGS. 4A and 4B has a rectangular wave shape.

The springs 72 are formed on both lateral sides of the base 71 at the end thereof facing in the X1 direction. The springs 72 are formed by bending the relevant portions of the base 71 substantially perpendicularly in the Z2 direction at fold sections 79 and further bending the relevant portions into a U shape in the width direction. With this arrangement, the relevant portions of the base 71 are provided with spring property in the contact direction.

Pressure portions 73 are formed at the tips of the springs 72, respectively. In the present embodiment, the pressure portions 73 extend in the X2 direction from the tips of the springs 72, respectively, as illustrated in FIG. 4B.

The mounting sections 74 and 75 extend outwardly from the center of the base 71 in the longitudinal direction. The mounting section 74 has a hole 74a through which a screw 26 (see FIG. 1) is made to pass and threadably attached to a hole 27 of the lower case 2B for securing the optical module 4. The mounting section 75 has a hole 75a at which a boss 28 formed on the lower case 2B is engaged and swaged when mounting the optical module 4 to the lower case 2B.

The engaging sections 76 are formed on both lateral sides of the base 71 at the end thereof facing in the X2 direction. The engaging sections 76 are formed by bending the engaging sections 76 in the Z2 direction relative to the base 71 at fold sections 77.

The board 8 has a conversion unit 81 and a connector 82 as illustrated in FIG. 1. The conversion unit 81 is situated at the center of the board 8. The connector 82 is situated at the end of the board 8 facing in the X1 direction.

The conversion unit 81 includes a light emitting device and a light receiving device. The end of the conversion unit 81 to be coupled with the optical module 4 is connected to the optical waveguide 67. The light receiving device converts light signals into electric signals transmitted to the conversion unit 81 through the optical waveguide 67. The light emitting device converts electric signals transmitted to the conversion unit 81 from the electronic apparatus via the connector 82 into optical signals.

The connector 82 is an edge connector, which is coupled to a terminal of a connector socket when the optical connector 1 is mounted to the connector socket of an electronic apparatus.

The cable boot 90 prevents the optical cable 52 from being detached from the optical module 4 (i.e., from the MT ferrule 5). The cable boot 90 includes a boot half 90a and a boot half 90b connected together. The optical cable 52 is disposed to pass through the cable boot 90.

The end of the cable boot 90 facing in the X1 direction has an engaging part 91. The engaging part 91 is engaged with the case 2 when the upper case 2A and the lower case 2B are fixedly connected. The engagement of the engaging part 91 with the case 2 prevents the cable boot 90 from moving with respect to the case 2 in the X1 or X2 direction in which the optical connector 1 moves with respect to the electronic apparatus.

A sleeve 92 is disposed inside the cable boot 90, and has the optical cable 52 passing therethrough. The sleeve 92 includes a sleeve half 92a and a sleeve half 92b. The sleeve half 92a and the sleeve half 92b have tubular part halves 96a and 96b, respectively, which constitute a tubular part 96. When the sleeve half 92a and the sleeve half 92b are assembled, the optical cable 52 is tightly held in the tubular part halves 96a and 96b.

The tubular part 96 has a ring (not shown) attached thereto. The inner space of the tubular part 96 has a diameter slightly smaller than the diameter of the optical cable 52. When the optical cable 52 is disposed in the sleeve 92, the ring is attached to the tubular part 96 and deformed to fix the optical cable 52 in the sleeve 92.

With the optical cable 52 being fixed in the sleeve 92, the optical cable 52 becomes integral with the sleeve 92. Further, the sleeve 92 engages with the cable boot 90.

The optical cable 52 extends outwardly from the optical connector 1, and is thus likely to be subjected to an external force. When an external force is applied to the optical cable 52 in the X2 direction, this external force is transmitted to the cable boot 90 through the sleeve 92 and the ring. Since the engaging part 91 is engaged with the case 2, however, the application of the force in such a direction as to remove the optical cable 52 does not result in the optical cable 52 being disconnected from the optical module 4.

The pull tab 95 may be used to pull off the optical connector 1 from the electronic apparatus. The pull tab 95 includes a body 95a and a ring 95b. The body 95a includes arms 94a and 94b. The ring 95b is integral with the body 95a, and has a ring shape that allows a finger to be inserted therethrough.

The arms 94a and 94b extend in the X1 direction from the body 95a. The arms 94a and 94b are engaged with the case 2 such as to be able to move a predetermined distance relative to the case 2. Unlocking tabs 97a and 97b are formed at the tips of the arms 94a and 94b, respectively.

The electronic apparatus into which the optical connector 1 is inserted has a detachment preventing mechanism that prevents the optical connector 1 from mistakenly detached from the electronic apparatus. The unlocking tabs 97a and 97b unlock the optical connector 1 from the detachment preventing mechanism.

In order to remove the optical connector 1 from the electronic apparatus, an operator pulls the pull tab 95 in the X2 direction, and the body 95a and the arms 94a and 94b move in the X2 direction.

In response to the movement of the arms 94a and 94b, the unlocking tabs 97a and 97b move in the X2 direction, and the optical connector 1 is unlocked from the detachment preventing mechanism. After this, the pull tab 95 is pulled to remove the case 2 from the electronic apparatus.

In the following, a description will be given of a ferrule boot 10A by referring to FIG. 7 through FIG. 10 in addition to FIG. 5 and FIG. 6.

Figure 7:
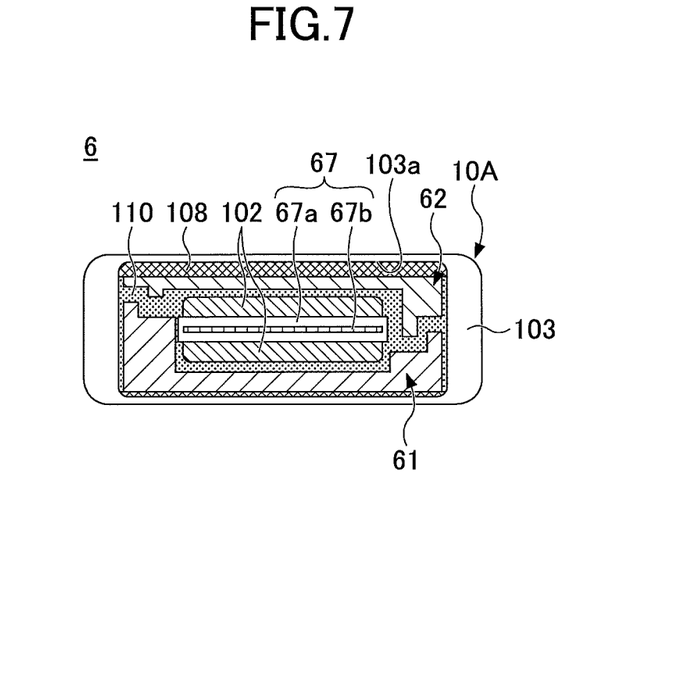
FIG. 7 is a cross-sectional view taken along a line C-C shown in FIG. 5.
Figure 8:
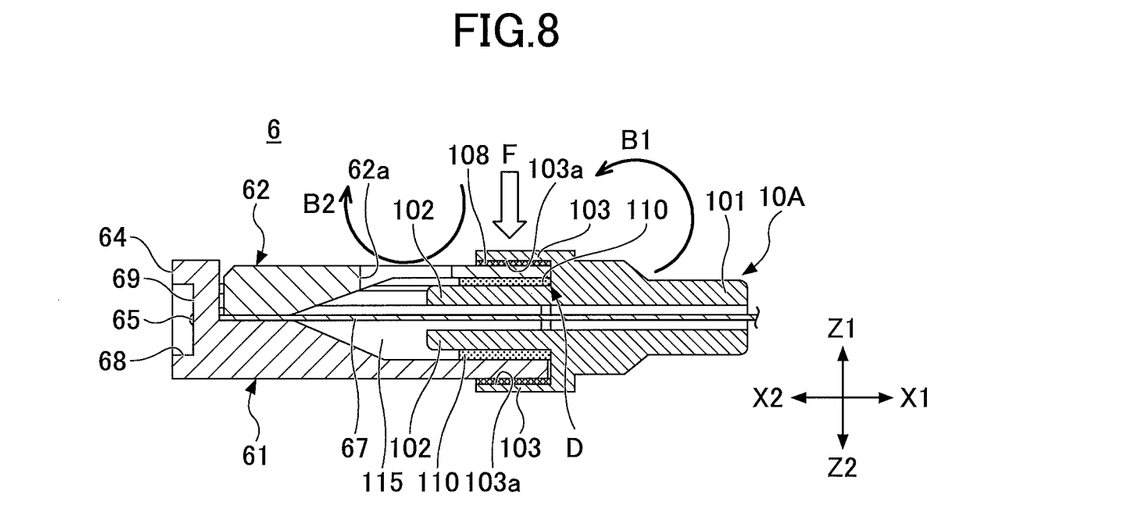
FIG. 8 is a cross-sectional view taken along a line D-D shown in FIG. 5.
Figure 9:
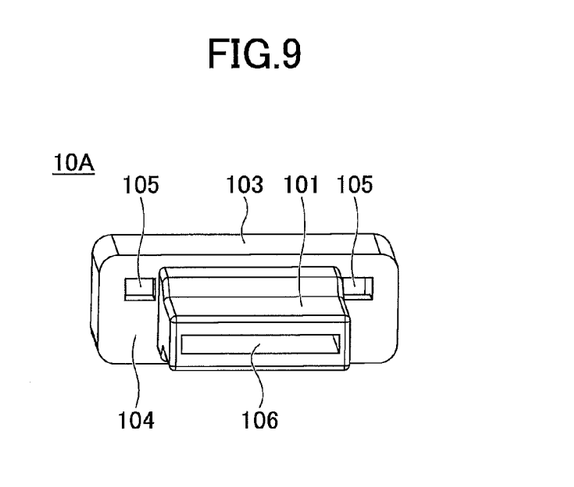
FIG. 9 is a perspective view of the ferrule boot.
Figure 10:
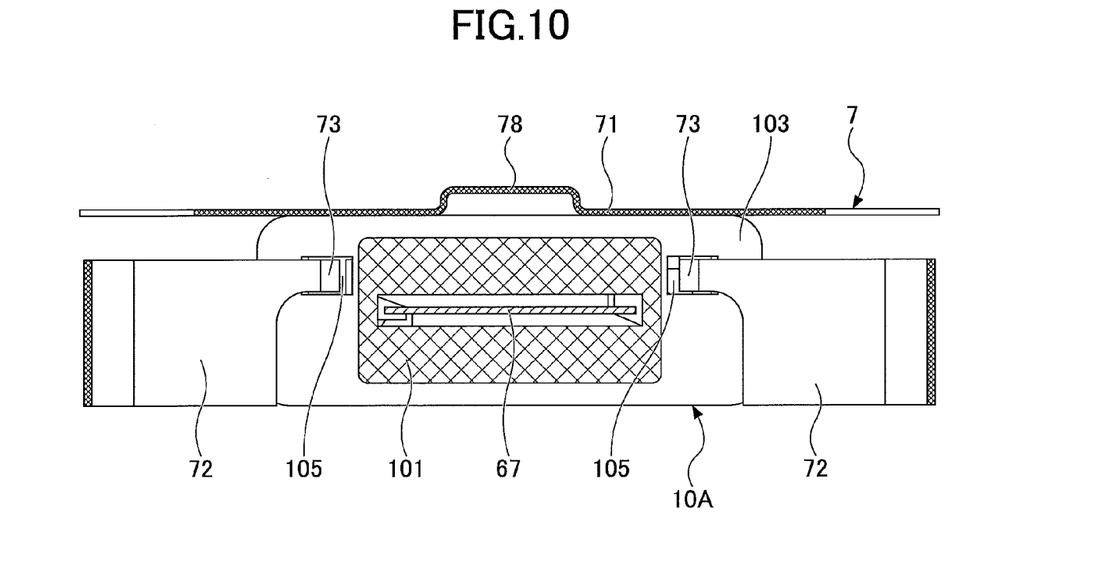
FIG. 10 is a cross-sectional view taken along a line A-A shown in FIG. 3.

FIG. 7 is a drawing illustrating a cross-section of the ferrule boot 10A taken along the line C-C in FIG. 5. FIG. 8 is a drawing illustrating a cross-section taken along the line D-D in FIG. 5. FIG. 9 is a drawing illustrating the ferrule boot 10A as viewed from the X1 direction. FIG. 10 is a drawing illustrating a cross-section taken along the line A-A in FIG. 3.

The ferrule boot 10A is disposed at the end of the lens ferrule 6 facing in the X1 direction as illustrated in FIG. 5 and FIG. 6. The ferrule boot 10A is made of elastic, deformable material such as silicon rubber, and includes a boot body 101, guides 102, a cover 103, and holes 105. The boot body 101, the guides 102, and the cover 103 are together formed as a unitary, seamless structure.

The boot body 101 holds the optical waveguide 67, and has a hole 106 (see FIG. 9) through which the optical waveguide 67 extends. The hole 106 is formed such as to penetrate through boot body 101 in the contact direction.

The guides 102 project from the end of the boot body 101 facing in the X2 direction as illustrated in FIG. 8. The guides 102 are disposed inside the cover 103.

The two guides 102 are arranged side by side in the Z direction on the two sides of the optical waveguide 67, respectively, when the optical waveguide 67 is attached to the boot body 101. With this arrangement, the optical waveguide 67 is not only protected by the boot body 101 but also protected by the guides 102.

The guides 102 are inserted into the lens ferrule 6 when attached to the lens ferrule 6. The L-shaped ferrule base 61 has the recess 61a in which the ferrule cover is disposed.

Disposing the cover 62 in the recess 61a creates a mounting space 115 inside the lens ferrule 6. The guides 102 are inserted into the mounting space 115.

Upon being inserted into the mounting space 115, the guides 102 are secured to the lens ferrule 6 by an adhesive 110. The adhesive 110, which is of an ultraviolet curing type, is injected into the mounting space 115 through a window 62a of the ferrule cover.

The adhesive 110 injected into the mounting space 115 spreads into the gap between the guides 102 and the ferrule base 61 as well as the gap between the guides 102 and the ferrule cover 62 as illustrated in FIG. 7 and FIG. 8. Subsequent radiation of ultraviolet light cures the adhesive 110, thereby fixedly mounting the guides 102 to the lens ferrule 6.

The cover 103 prevents the ferrule cover 62 from being detached from the ferrule base 61, and also prevents the ferrule boot 10A from being disconnected from the lens ferrule 6. With the ferrule boot 10A attached to the lens ferrule 6, the cover 103 caps and covers all around the end of the lens ferrule 6 as illustrated in FIG. 5 through FIG. 8.

A mounting part 103a is formed inside of the cover 103. The mounting part 103a has a shape coinciding with the shape of a portion of the lens ferrule 6 that is inserted into the ferrule boot 10A. More specifically, the mounting part 103a has a shape that is slightly larger than the outer shape of the lens ferrule 6. Upon attaching the cover 103 to the lens ferrule 6, a gap is thus created between the inner surface of the cover 103 and the outer surface of the lens ferrule 6.

An adhesive 108 is injected into the gap between the cover 103 and the lens ferrule 6 as illustrated in FIG. 7. The adhesive 108 may be an instantaneous adhesive agent of gel type.

To secure the cover 103 to the lens ferrule 6, the adhesive 108 is coated to at least one of the inner surface of the cover 103 and the outer surface of the lens ferrule 6, followed by attaching the cover 103 to the lens ferrule 6. With this arrangement, the cover 103 is fixedly attached to the lens ferrule 6 in such a manner as to cover the lens ferrule 6.

The coverage length of the lens ferrule 6 covered by the cover 103 in the X direction is set to a desired length. The coverage length may preferably be set to as long a length as possible to prevent the ferrule cover 62 from being detached from the ferrule base 61 and also to prevent the ferrule boot 10A from being disconnected. In the present embodiment, as the window 62a is formed in the ferrule cover 62, the coverage length is set to the possible maximum length that still allows the window 62a to be fully exposed.

A rear face 104 of the cover 103 facing in the X1 direction has the holes 105 that penetrate the rear face 104 as illustrated in FIG. 6 and FIG. 9. The holes 105 are formed at two lateral sides of the point at which the boot body 101 is attached to the rear face 104.

The holes 105 are engaged with the pressure portions 73 formed at the spring sections 72 of the clip 7 as illustrated in FIG. 10.

The movement of the clip 7 is regulated by engaging the pressure portions 73 with the holes 105. Namely, when the pressure portions 73 are engaged with the interior walls of the holes 105, the movement of the clip 7 in the in-plane direction of the rear face 104 is suppressed. Displacement of the clip 7 relative to the ferrules 5 and 6 is thus prevented even when an external force is applied to the clip 7.

If the rear face 104 were a flat surface having no holes 105, application of an external force to the clip 7 would cause the pressure portions 73 to slide over the rear face 104, resulting in a displacement of the clip 7. With a large displacement, the pressure portions 73 may be detached from the rear face 104, which gives rise to a risk of the clip 7 being disconnected from the ferrules 5 and 6.

The holes 105 in the rear face 104 prevents a displacement of the pressure portions 73 engaged with the holes 105, and the clip 7 is maintained to its intended mounting position. This arrangement enables the connection between the MT ferrule 5 and the lens ferrule 6 to be kept in a satisfactory condition, thereby preventing a drop in the optical transmission efficiency.

Figure 11:
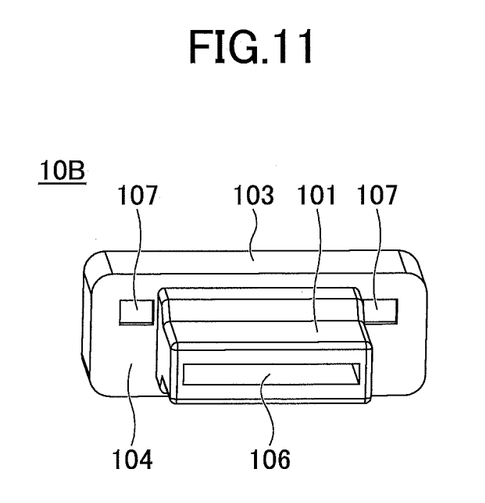
FIG. 11 is a perspective view of a variation of the ferrule boot.

The configuration that enables the engagement of the pressure portions 73 is not limited to holes. FIG. 11 is a drawing illustrating a variation of the ferrule boot 10B viewed from the rear side. A ferrule boot 10B has recesses 107 in place of the holes 105.

While the holes 105 penetrate the rear face 104, the recesses 107 do not penetrate the rear face 104. In this specification, a hollow that is formed in a face and penetrates the face is referred to as a hole, while a hollow that does not penetrate the face is referred to as a recess.

The recesses 107 have such a depth that the pressure portions 73 are not easily disengaged from the recesses 107 despite the application of an external force to the ferrule clip 7. The recesses 107 can prevent the clip 7 from being displaced, similarly to the holes 105. Further, this arrangement allows an external force applied to the clip 7 to be transmitted to the ferrules via the recesses 107, thereby enabling the protection of the ferrules.

In the following, a description will be given of the assembling of the optical module 4 and how to make the ferrule boot 10A.

When assembling the optical module 4, the ferrule boot 10A is fixedly attached to the lens ferrule 6 in advance. Namely, the cover 103 covers the predetermined length of the lens ferrule 6 prior to the start of assembling of the optical module 4.

The MT ferrule 5 is then brought in contact with the lens ferrule 6. When the MT ferrule 5 and the lens ferrule 6 come in contact with each other, the guide pins for aligning the MT ferrules and the lens ferrules 6 with each other are inserted into the pin holes at the contact faces of the ferrules 5 and 6, so that the optical fibers of the optical cable 52 and the cores of the optical waveguide 67 are optically coupled with each other with high precision.

Upon the ferrules 5 and 6 being placed in contact, the clip 7 is attached to the ferrules 5 and 6. In order to attach the clip 7 to the ferrules 5 and 6, the edges of the engaging sections 76 are first engaged with a bulge 5a (see FIG. 3) that is a raised step formed on the faces of the MT ferrule 5.

The clip 7 is then rotated around the engagement point between the raised step of the bulge 5a and the edges of the engaging sections 76 to be moved toward the ferrules 5 and 6. This movement of the clip 7 causes the pressure portions 73 to be placed on the rear face 104 of the ferrule boot 10A. Further movement of the clip 7 causes the pressure portions 73 to engage with the holes 105 formed in the rear face 104.

With the pressure portions 73 engaged with the holes 105, the MT ferrule 5 is held by the engaging sections 76, and the springs 72 urge the lens ferrule 6 toward the MT ferrule 5. The clip 7 maintains the MT ferrule 5 and the lens ferrule 6 in a contact condition.

At the time of aligning the ferrules 5 and 6 when assembling the optical module 4, a conveyance apparatus is utilized to handle the lens ferrule 6. During the operations for handling the lens ferrule 6, a handling arm may exert an impacting force or external force to the lens ferrule 6. The external force functions as a force for disconnecting the ferrule boot 10A from the lens ferrule 6 and a force for detaching the cover 62 from the ferrule base 61. A description will be given of the function of this external force by referring to FIG. 15 which illustrating a comparative example.

Figure 15:
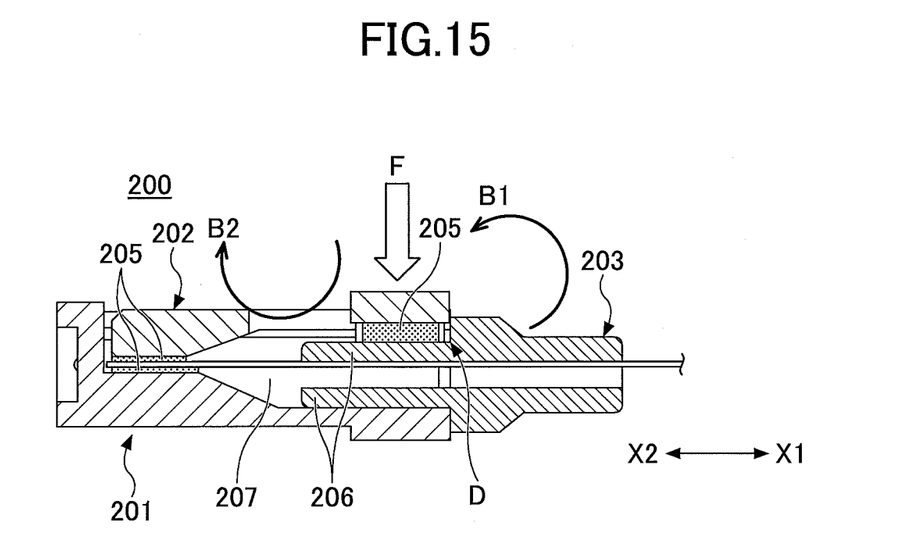
FIG. 15 is a cross-sectional view of a lens ferrule of a comparative example.

FIG. 15 is a drawing illustrating a lens ferrule 200 of a comparative example that has a ferrule boot 203.

The ferrule boot 203 of the comparative example does not have a cover. Guides 206 which are inserted into a mounting space 207 between a ferrule base 201 and a ferrule cover 202 are secured to the lens ferrule 200 by an adhesive 205. The lens ferrule 200 does not have a cover so that the outer faces of the ferrule base 201 and the ferrule cover 202 are exposed at the end toward the X1 direction. Handling of the lens ferrule 200 may cause an external force created by the handling action to be exerted to the lens ferrule 200.

The lens ferrule 200 does not have the configuration to alleviate an external force. As illustrated in FIG. 15, an external force F applied to the position of the adhesive 205 reaches the adhesive 205 without being mitigated, thereby being likely to cause damage to the adhesive 205. Damaged adhesive 205 may have decreased adhesion force, so that the ferrule cover 202 and the ferrule boot 203 are more likely to be disconnected from the lens ferrule 200.

Further, the exertion of the external force F to the ferrule cover 202 also applies pressure to the guides 206. The pressure applied to the guides 206 creates a force for rotating the ferrule boot 203 in the direction shown by an arrow B1 around the pivot indicated by an arrow D in FIG. 15, i.e., the point at which the X1-direction end of the ferrule cover 202 attached to the ferrule base 201 is situated. The force B1 functions as a force for disconnecting the ferrule boot 203 from the lens ferrule 200. This force will hereinafter be referred to as a disconnecting urging force B1.

As the external force F is applied to a point situated further toward the X1 direction than the center of the ferrule cover 202, a rotating force as indicated by an arrow B2 is created that functions to move the X2-direction end of the ferrule cover 202 in the Z1 direction. This force B2 serves as a force for detaching the ferrule cover 202 from the ferrule base 201. This force will hereinafter be referred to as a detaching force B2.

The lens ferrule 200 does not have the member that mitigates the external force F applied to the ferrule boot 203. The ferrule boot 203 does not have the member that stands against the disconnecting urging force B1 and the detaching force B2. Upon the exertion of the external force F to the lens ferrule 200, thus, the ferrule cover 202 may easily be detached from the ferrule base 201, and, also, the ferrule boot 203 may easily be disconnected from the lens ferrule 200.

In the present embodiment, on the other hand, the ferrule boot 10A has the cover 103 that covers the lens ferrule 6 as illustrated in FIG. 8. Since the ferrule boot is made of elastic material, the external force F applied to the cover 103 is mitigated by the cover 103.

This arrangement reduces an effect of the external force F on the adhesive 108 and 110, thereby preventing damage to the adhesive 108 and 110. Prevention of damage to the adhesive 108 and 110 allows the adhesive 108 and 110 to retain their adhesion force, thereby preventing the ferrule boot 10A and the ferrule cover 62 from being disconnected.

The cover 103 extends toward the X2 direction from the pivot D around which the ferrule boot 10A would rotate, as illustrated in FIG. 8. With this arrangement, the disconnecting urging force B1 applied to the ferrule boot 10A due to the application of the external force F is received by the cover 103, so that the rotation of the ferrule boot 10A in the direction B1 is suppressed. The cover 103 thus prevents the ferrule boot 10A from being disconnected from the lens ferrule 6.

Further, the cover 103 is disposed to enclose the end of the lens ferrule 6, to surround the outer faces of the ferrule base 61 and the ferrule cover 62 near the end toward the X1 direction. This configuration allows the ferrule boot 10A to support the ferrule cover 62, which prevents the ferrule cover 62 from being detached from the ferrule base 61 even when the detaching force B2 is applied to the ferrule cover 62 due to the application of the external force F.

Figure 12:
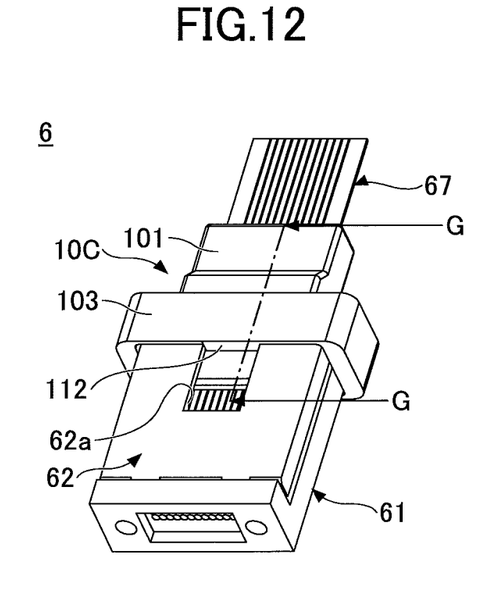
FIG. 12 is a perspective view of a lens ferrule of another embodiment.
Figure 13:
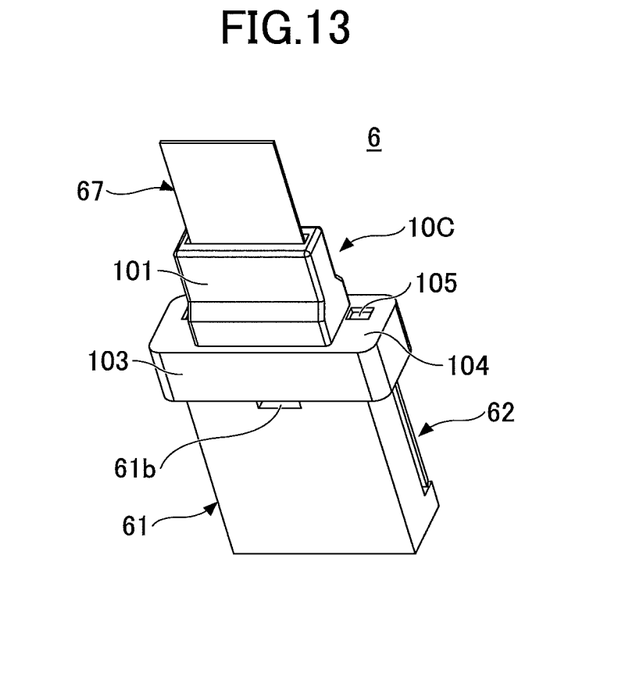
FIG. 13 is a perspective view of the lens ferrule of FIG. 12 as viewed from a ferrule-boot side.
Figure 14:
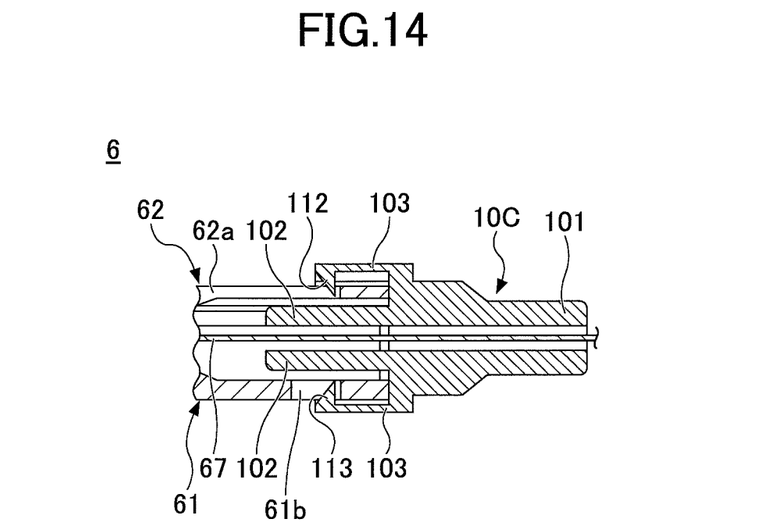
FIG. 14 is a cross-sectional view taken along a line G-G shown in FIG. 12.

In the following, a description will be given of another embodiment of the optical connector by referring to FIG. 12 through FIG. 14. In FIGS. 12 through 14, the same or corresponding elements as those of FIGS. 1 through 11 are referred to by the same numerals, and a description thereof will be omitted as appropriate.

This embodiment differs from the first embodiment in the configuration by which a ferrule boot is attached to the lens ferrule 6. The remaining configurations are the same. A description will be given only of the lens ferrule 6 and a ferrule boot 10C.

The present embodiment is provided with a securement mechanism that secures the ferrule boot 10C to the lens ferrule 6. The securement mechanism includes a hole 61b, a window 62a, and clicks 112 and 113.

The hole 61b and the window 62a serve as engagement parts with which the clicks 112 and 113 are engaged. The hole 61b is formed in the ferrule base 61 as illustrated in FIG. 13. The window 62a is formed in the ferrule cover 62 as illustrated in FIG. 12.

The clicks 112 and 113 are formed in the inside of the cover 103. The click 112 is situated at such a position on the cover 103 as to face the ferrule cover 62. The click 113 is situated at such a position on the cover 103 as to face the bottom face of the ferrule base 61.

In order to attach the ferrule boot 10C to the lens ferrule 6, the lens ferrule 6 is simply inserted into the cover 103 without using an adhesive. In the present embodiment, thus, there is no need to provide a gap between the lens ferrule 6 and the cover 103 for accommodating adhesive.

Insertion of the lens ferrule 6 into a the cover 103 causes the click 112 to engage with the edge of the window 62a, and causes the click 113 to engage with the edge of the hole 61b. As a result, the ferrule boot 10C is fixedly attached to the lens ferrule 6.

In the present embodiment, the ferrule boot is secured to the lens ferrule by simply inserting the lens ferrule 6 into the cover 103, which enables the securing process to be easily performed.

The present embodiment is directed to a configuration in which the lens ferrule 6 has the hole 61b and the window 62a, and the cover 103 has the clicks 112 and 113. Alternatively, the lens ferrule 6 may have clicks, and the cover 103 has holes.

Although the engagement parts that are engaged with the clicks 112 and 113 are holes in the present embodiment, the engagement parts do not have to be holes, and may be recesses.

Further, the present invention is not limited to these embodiments, but various variations and modifications may be made without departing from the scope of the present invention.

The present application is based on and claims the benefit of priority of Japanese priority application No. 2015-112610 filed on Jun. 2, 2015, with the Japanese Patent Office, the entire contents of which are hereby incorporated by reference.

What is claimed is:

1. An optical connector, comprising:
a ferrule;
an optical waveguide attached to the ferrule; and
a boot attached to the ferrule to protect the optical waveguide, the boot being a single seamlessly continuous piece,
wherein the boot includes a cover part that covers the ferrule, and
wherein in a cross-section of the optical connector taken perpendicularly to a longitudinal direction of the optical waveguide and taken where the ferrule and the boot overlap each other, a first part of the boot is situated over the optical waveguide, a first part of the ferrule being situated over the first part of the boot, with a second part of the boot being situated over the first part of the ferrule, and, also, a third part of the boot is situated under the optical waveguide, a second part of the ferrule being situated under the third part of the boot, with a fourth part of the boot being situated under the second part of the ferrule, the second part of the boot and the fourth part of the boot being at least a portion of the cover part.

2. The optical connector as claimed in claim 1, further comprising a securing mechanism configured mechanically to secure the boot to the ferrule.

3. The optical connector as claimed in claim 2, wherein the securing mechanism includes:
   a click formed on one of the boot and the ferrule; and
   an engagement part formed on another one of the boot and the ferrule and configured to be engaged with the click.

4. The optical connector as claimed in claim 1, further comprising a clip attached to the ferrule having an engagement part, wherein the boot has a hole or recesses configured to engage with the engagement part.

5. An optical connector, comprising:
   a ferrule having a first end and a second end;
   an optical waveguide attached to the ferrule at the first end thereof; and
   a boot having a hole and attached to the ferrule at the first end thereof to surround the optical waveguide extending through the hole, the boot being a single seamlessly continuous piece,
   wherein the boot includes a cover that caps the first end of the ferrule, and
   wherein in a cross-section of the optical connector taken perpendicularly to a longitudinal direction of the optical waveguide and taken where the ferrule and the boot overlap each other, a first part of the boot is situated over the optical waveguide, a first part of the ferrule being situated over the first part of the boot, with a second part of the boot being situated over the first part of the ferrule, and, also, a third part of the boot is situated under the optical waveguide, a second part of the ferrule being situated under the third part of the boot, with a fourth part of the boot being situated under the second part of the ferrule, the second part of the boot and the fourth part of the boot being at least a portion of the cover.

6. The optical connector as claimed in claim 5, wherein the boot includes a guide extending into an inside the ferrule, such that an outer face of the ferrule at the first end thereof are situated between the cover and the guide part.

* * * * *